United States Patent [19]
Walker et al.

[11] Patent Number: 5,495,525
[45] Date of Patent: Feb. 27, 1996

[54] NON-VOLATILE AUTOMATIC TELEPHONE NUMBER DIALER CIRCUIT

[75] Inventors: Rickey R. Walker; David O. Hanon, both of Ringgold, Ga.

[73] Assignee: Choice Communication Products, Inc., Ringgold, Ga.

[21] Appl. No.: 297,482

[22] Filed: Aug. 29, 1994

[51] Int. Cl.[6] ............................................. H04M 1/26
[52] U.S. Cl. ........................... 379/355; 379/37; 379/52; 379/216
[58] Field of Search ...................... 379/37, 38, 40, 379/45, 51, 52, 216, 352, 353, 354, 355, 356, 359, 361

[56] References Cited

U.S. PATENT DOCUMENTS

| | | | |
|---|---|---|---|
| 4,103,115 | 7/1978 | Milkes | 379/355 |
| 4,315,108 | 2/1982 | Hoffman et al. | 379/361 |
| 4,417,100 | 11/1983 | Carlson et al. | 379/51 |
| 4,802,208 | 1/1989 | Yeh | 379/216 |
| 5,333,172 | 7/1994 | Stevens | 379/38 |
| 5,388,144 | 2/1995 | Nichols | 379/40 |

OTHER PUBLICATIONS

"Convert Keyboard or Computer Signals to Serial Pulses for Automatic Phone Dialing", P. Ritamaki:, Electronic Design, vol. 24, No. 5, p. 68, Mar. 1, 1976.
"Build an Emergency Telephone Dialer", A. Caristi, Popular Electronics Sep. 1992, pp. 30–42, 90–91.

Primary Examiner—Jeffery Hofsass
Assistant Examiner—Scott L. Weaver
Attorney, Agent, or Firm—Alan Ruderman

[57] ABSTRACT

A telephone having a non-volatile circuit for automatically dialing 911 upon depression of a single key includes an oscillator activated in response to depression of the key for transmitting clock pulses to a counter. Certain of the output signals from the counter are applied to switches in sequence. The switches are connected to selective column and row leads of the telephone dialer circuit corresponding to the digits in the telephone number to be dialed. The switches short together the respective column and row leads so that the dialer reacts in the same manner it would when the keys of those digits are depressed on the telephone keypad. An output pulse from the counter resets the circuit after the switch connects together the column and row leads of the last digit of the telephone number.

9 Claims, 1 Drawing Sheet

NON-VOLATILE AUTOMATIC TELEPHONE NUMBER DIALER CIRCUIT

BACKGROUND OF THE INVENTION

This invention relates to telephones and more particularly to a one touch button dialing circuit for a universal number in a telephone for rapidly accessing an emergency service, the telephone number not requiring user programming and being non-volatile in that it is not affected by power outages.

Although many conventional telephones have the feature of one touch button or automatic dialing whereby a telephone number may be automatically dialed merely by mashing a single touch key or button, such features include a memory chip which must be programmed by the user. These systems use volatile memory requiring electrical power to keep the information stored. If the electrical power is removed, all information stored in the memory is lost. Most telephones require the use of batteries as the power source to retain the telephone number in memory. Others, such as those having automatic answering features or lights, have power cords which connect into an electrical outlet and this retains the information in memory. Some of the latter include memory backup batteries. If, however, a power failure occurs and/or a battery depletion, the programmed telephone numbers are lost from memory and must be restored in memory by reprogramming.

It is well known that some people, although proficient in the use of the telephone, have difficulties in programming numbers into such telephone memory. For example, many infirm and elderly people find it extremely difficult to perform the programming task, yet these are the very people who require a quick or one touch automatic dialing of an emergency telephone number.

SUMMARY OF THE INVENTION

Consequently, it is a primary object of the present invention to provide a telephone having apparatus that permits dialing a telephone number to access an emergency service by depression of a single key or button, the apparatus being non-volatile and requiring no user programming.

It is another object of the present invention to provide an electrical circuit in a telephone which upon activation automatically dials an emergency service telephone number, the circuit not requiring programming and not having volatile memory.

It is a further object of the present invention to provide in a telephone a circuit activated by depression of a single touch button having oscillator means for pulsing a counter which has outputs that sequence from a low output to a high output only at a respective time interval, certain of the outputs activating a respective switch for connecting to a pre-selected row and column of the telephone dialer circuit to dial the number corresponding to the row and column on the dial keypad matrix.

Accordingly, the present invention provides a simple circuit in a telephone which permits one touch button dialing of a generally used emergency access telephone number, the circuit requiring no programming and not being affected by power outages and the like. The circuit includes oscillating signal generating means activated by depression of the button to provide a series of pulses to an octal counter with decoded outputs which in turn sequences the operation of a number of analog switches, the input to the switches being connected to the output terminals of the counter. The output of the switches are wired into the column and row circuit of the telephone dialer matrix to short together in sequence the column and row of each of the digits corresponding to the number to be dialed so that the dialer circuit responds in the same manner as if the key or button corresponding to the digits in the dialer pad matrix had been depressed in sequence. Specifically, the invention provides the circuitry for dialing 911 and thus corresponding analog switches are provided at outputs of the counter. Upon lifting the handset and mashing the button, the 911 telephone number is automatically dialed.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
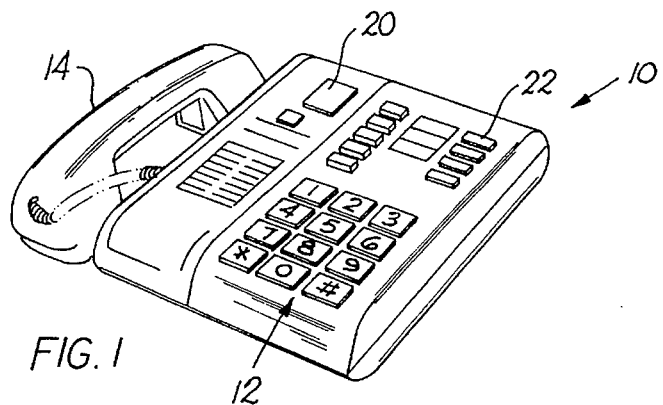
FIG. 1 is a perspective view of a conventional touch button telephone and having circuitry activated by depression of a single button according to the present invention.

Referring now to the drawings, a telephone 10 is illustrated having a conventional touch button keypad 12 and a handset 14. The keypad 12 has the touch button digits disposed in three columns of four rows. As is well known in the art, the digit buttons actuate a matrix of corresponding switches 16, illustrated in FIG. 2, connected in a circuit having conductors corresponding to each of the columns and rows wired to a logic circuit comprising the dialer circuit 18. The dialer circuit 18 is well known and is generally an integrated circuit chip. When a digit button on the keypad 12 is depressed or mashed, the switch corresponding to that button closes the circuit of the column and row leads to the dialer circuit. When the handset 14 is removed from the "hook" or circuit closing button 20, or speaker-type telephones when a speaker phone button is depressed, voltage is applied to the dialer circuit and depression of a digit button results in the dialer circuit dialing the number corresponding thereto.

The number 911 generally, if not universally, has been adopted as an emergency telephone number to rapidly access local police departments. Dispatchers receiving calls on that number proceed speedily in routing police and/or emergency vehicles to the location of the phone from where the call was placed. Ideally, it is desirable for telephones to have a rapid dialing mode for dialing the 911 telephone number Telephones having a memory feature permit a telephone number such as this to be placed in memory and dialed by depression of a single memory button or key. However, as aforesaid, the memory feature of conventional telephones have memory chips which must be programmed and such memory is volatile in that it requires electrical power to maintain the programmed information. If there is a failure in the power system caused by a storm or the like and/or a battery depletion failure, the memory chip must be reprogrammed, and this may be difficult for a segment of the population.

According to the present invention an automatic dialing circuit automatically connects the row and column circuit of the telephone dialer switch matrix in sequence to enable the dialing of a telephone number such as the 911 emergency telephone number simply by depressing a single key or button 22 on the face of the telephone. Preferably the circuit is implemented by integrated circuit means to sequence events resulting in the telephone dialer circuit dialing the telephone number 911. The circuit comprises an oscillator for providing clocking pulses upon depression of an activation key or button to a counter which acts as a sequencer. A series of switches, each corresponding to a digit of the telephone number to be dialed, e.g., 911, receives the signals in sequence and closes a circuit from the dialer chip with the respective column and row corresponding to the telephone number to be dialed. Thus, when the automatic dialing circuit is activated, a circuit is closed from the dialer chip to the column and row to the key on the dial pad corresponding to the number 9 digit. Thereafter in sequence a circuit is closed twice from the dialer chip to the column and row corresponding to the number 1 digit.

Figure 2:
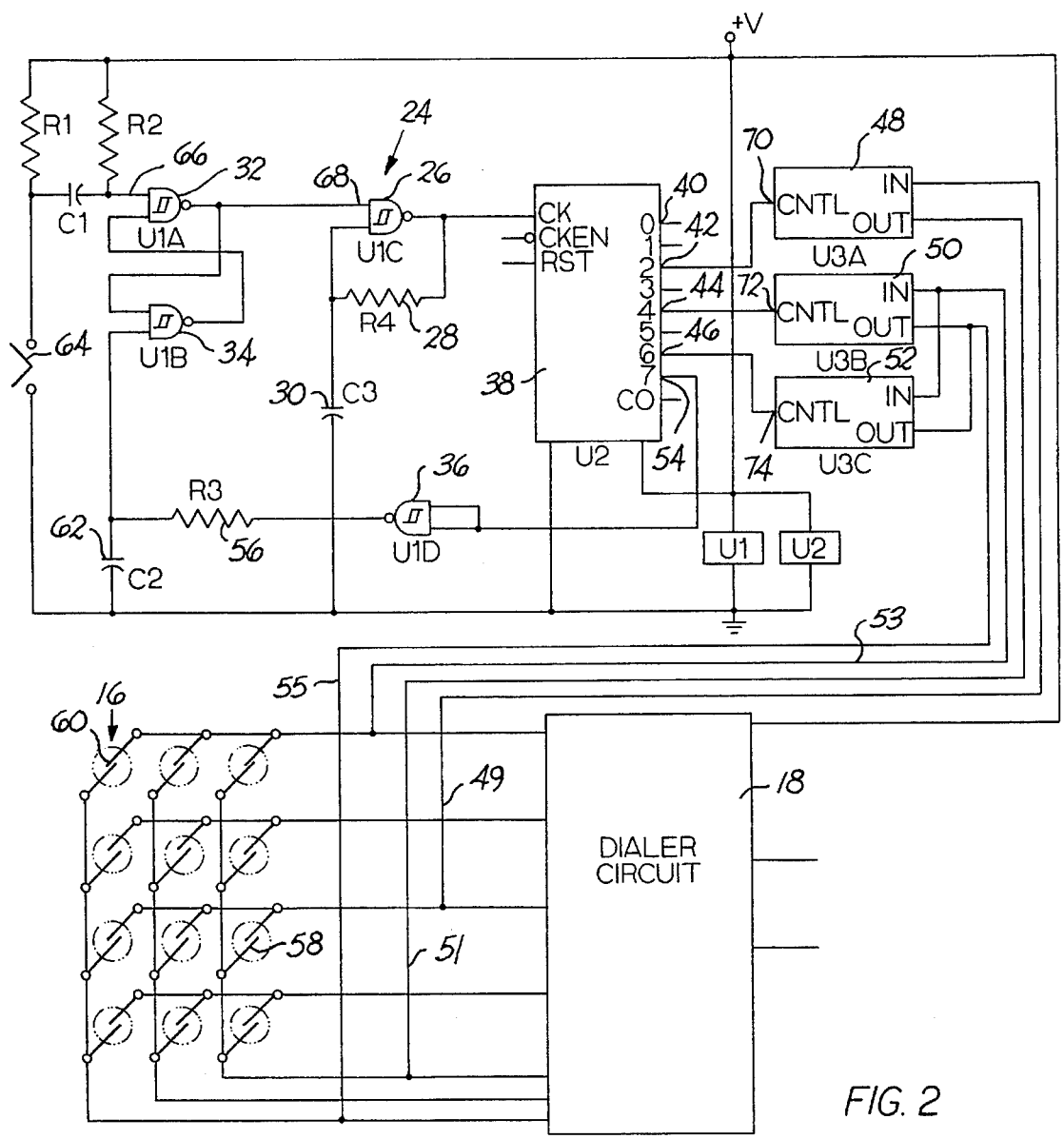
FIG. 2 illustrates an electrical circuit according to the present invention connected to the column and row matrix of a conventional telephone keypad and dialer chip.

As illustrated in FIG. 2, the circuit of the present invention includes an oscillator circuit 24 comprising a Schmitt-trigger in the form of a two input NAND gate 26 together with resistor 28 and capacitor 30 for outputting pulses at a frequency of 3 Hz. The oscillator is driven by a flip-flop comprising NAND gates 32 and 34. In the preferred embodiment the NAND gates 26, 32 and 34 together with a fourth NAND gate 36 conveniently comprises a quadruple or quad two-input NAND Schmitt-trigger integrated circuit such as Motorola Model MC 14093B chip. The NAND gate 36 has its inputs tied together so that it functions as an inverter. The chip and each of the gates thereon is powered by positive D.C. voltage supplied to a common pin and is grounded at a common pin, shown conveniently in the block designated U1, while the gates may be designated conventionally as U1A, U1B, U1C and U1D.

The output pulses from the gate 26 are supplied to the clock input of a counter 38 which may be a MOD-8 or divide by 8 Johnson Counter in integrated circuit form such as a Motorola Model MC 14022B Octal counter with decoded outputs. At rest this chip has a first output pin 40 at a high state and upon receipt of clock pulses, the high state advances sequentially to the other output pins. Thus, the counter 38 functions as a sequencer to sequence the output pulses incrementally.

Alternate output pins 42, 44, 46 of the counter 38 are respectively connected to analog switches 48, 50, 52 while the last output pin 54 is routed through the inverter 36 and through a resister 56 for resetting the flip-flop comprising gates 34 and 32. The carry pin, of course, is not connected, nor are the other alternate pins. The analog switches 48, 50, 52 each have two outputs. The outputs of the switch 48 are connected to the row and column lines 49 and 51 respectively between the number 9 digit keypad switch 58 and the dialer circuit 18 while the outputs of the switches 50 and 52 are each connected to the row and column lines 53 and 55 respectively between the number 1 digit keypad switch 60 and the dialer circuit 18. Thus, when pin 42 of the counter 38 goes high, the switch 48 shorts the row and column lines 49 and 51 corresponding to the number 9 digit together with the dialer circuit 18. Similarly when pins 44 and 46 go high, the switches 50 and 52 respectively connect the row and column lines 53 and 55 corresponding to the number 1 digit together in the dialer circuit. The time sequencing provided by the counter 38 of the high outputs at pins 42, 44, 46 provides sufficient time between output pulses to the switches for the dialing of the individual numbers so that each number may be dialed in turn.

The analog switches preferably comprise a quad analog switch integrated circuit such as Motorola model MC 14066B, and since the fourth switch of the chip is not being used in this application, it is not illustrated in FIG. 2. Again, since the chip, and thus each of the switches thereon, is powered by positive D.C. voltage supplied to a common pin and is grounded at a common pin, this is conveniently illustrated in the block designated U3, corresponding to the switches U3A, U3B, and U3C.

Removal of the handset 14 from the hook to release the button 20 results in positive voltage from the dialer circuit 18 rising to approximately 3 to 5 volts across capacitor 62 which thereby holds the output of the NAND gate 34 low for a fraction of a second as the capacitor 62 charges through the resister 56. This resets the flip-flop comprising the gates 32 and 34 readying it for dialing. When the key or button 22 is depressed, switch 64 is closed resulting in a low voltage applied to inlet pin 66 of the gate 32. This sets the flip-flop resulting in a positive voltage at the outlet of the gate 32 and thus at the inlet pin 68 of the gate 26. This results in the oscillator 24 commencing transmittal of pulses to the clock input pin of the pulse counter 38. As aforesaid, at rest the output pin 40 of the pulse counter is high and all the other outputs are low.

When input clock pulses are received at the clock input, the high output advances sequentially. First an unconnected pin goes high resulting in no action. Thereafter pin 42 goes high enabling the control pin 70 of analog switch 48 thereby connecting its input and output together which connects the row and column leads in the circuit of the number 9 digit on the phone dialer matrix so that the dialer circuit dials the number 9. The next pulse on the clock input of the counter 38 causes an unconnected pin to go high and thus no action is effected. The subsequent pulse causes the output pin 44 to go high and enabling control pin 72 of the analog switch 50. This connects the input and output of the switch 50 together and thus connects the column and row leads together in the circuit of the number 1 digit button on the dialer matrix resulting in the dialer circuit dialing the number 1. The subsequent pulse at the input of the counter 38 causes another unconnected pin to go high so that again no action is taken. The following pulse at the input of the counter 38 results in the output pin 46 going high to enable the control pin 74 of the analog switch 52. This again results in connecting the row and column circuit of the number 1 digit button on the phone dialer matrix to again effect dialing of the number 1. Of course only two switches may be necessary since the output pins 44 and 46 of the counter 38 may be connected to one switch since the number 1 digit is dialed twice. However, in the preferred embodiment the quad switch is utilized so that the two different switches are used conventionally. Thus, the dialer circuit 18 first functions as if the number 9 digit has been depressed on the keypad to close switch 58, and thereafter functions as if the number 1 digit button on the keypad was twice depressed in sequence to twice close switch 60. On the subsequent pulse at the clock input of the counter 38 output pin 54 goes high and this pulse acts through the inverter comprising the gate 36. This results in resetting of the flip-flop comprising the gates 32 and 34 completing the sequence which may be reinstigated by again closing the switch 64 by depression of the key 22 with the handset 14 removed from the button 20.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a telephone having a keypad including keys corresponding to ten numerical digits arranged in an array of rows and columns, dialer circuit means including a respective pair of electrical leads corresponding to each key, one lead of each pair of leads corresponding to the row and the other lead of each pair to the column of the key, a switch corresponding to each key for connecting together the column and row leads of the key associated therewith when the key is depressed to close said circuit means and provide a dialing signal corresponding to the depressed key, the improvement comprising:

a non-volatile circuit for automatically dialing a preselected telephone number having a plurality of digits for accessing an emergency service having the telephone number, said non-volatile circuit including activation switch means, oscillator means for providing a train of output clock pulses in response to closure of said activation switch means, a sequencer having input means for receiving said train of pulses and having a plurality of output means, each of said output means sequencing from a normally low state to a high state in response to each pulse of said train of pulses and thereafter recycling back to the low state to provide an output pulse at each of said output means at a different time than at each of the other output means, an electronic switch corresponding to at least each different digit in said telephone number, each of said electronic switches having an input terminal connected to one lead of said pair of leads corresponding to the key associated with a digit of said telephone number and an output terminal connected to the other lead of said pair of leads, each of said electronic switches having a respective control means connected to a selected one of said output means of said sequencer, each of the control means acting to make a connection between the input and output terminals of the respective electronic switch only when enabled by said high state at the respective output means, the respective electronic switch corresponding to a first digit of said telephone number being connected to an output means sequenced to said high state before the output means connected to the electronic switches corresponding to subsequent digits of said number, whereby upon the closure of said activation switch means the column and row leads of a respective one of the digits of said telephone number are connected together one at a time in sequence in response to the connection of the respective electronic switch corresponding to the digit.

2. In a telephone as recited in claim 1, wherein the telephone number is the three digit number 911 and wherein there are three electronic switches.

3. In a telephone as recited in claim 1, wherein said oscillator means includes a flip-flop and an inverter, and wherein an output means of said sequencer other than a selected one of the output means provides a resetting pulse subsequent in time to the pulses received by said electronic switches, and means for conveying said resetting pulse to said flip-flop through said inverter for resetting said flip-flop to ready said non-volatile circuit for redialing said telephone number.

4. In a telephone as recited in claim 3, wherein the closure of said activation switch means sets said flip-flop to trigger commencing said train of pulses.

5. In a telephone as recited in claim 1, wherein said sequencer is an octal counter for dividing the frequency of the pulse train by 8.

6. In a telephone as recited in claim 5, wherein the telephone number is the three digit number 911 and wherein there are three electronic switches.

7. In a telephone as recited in claim 5, wherein said oscillator means includes a flip-flop and an inverter, and wherein an output means of said sequencer other than a selected one of the output means .provides a resetting pulse subsequent in time to the pulses received by said electronic switches, and means for conveying said resetting pulse to said flip-flop through said inverter for resetting said flip-flop to ready said non-volatile circuit for redialing said telephone number.

8. In a telephone as recited in claim 7, wherein the closure of said activation switch means sets said flip-flop to trigger commencing said train of pulses.

9. In a telephone having a keypad including keys corresponding to ten numerical digits arranged in an array of rows and columns, dialer circuit means including a respective pair of electrical leads corresponding to each key, one lead of each pair of leads corresponding to the row and the other lead of each pair to the column of the key, a switch corresponding to each key for connecting together the column and row leads of the key associated therewith when the key is depressed to close said circuit means and provide a dialing signal corresponding to the depressed key, the improvement comprising:

a non-volatile circuit for automatically dialing a preselected telephone number for accessing an emergency service having the telephone number, said non-volatile circuit including actuation switch means, oscillator means for providing a train of output pulses of a first frequency in response to closure of said switch means, counter means for receiving and dividing said train of pulses into separate sequenced pulses of a lower frequency than the frequency of said train of pulses, and circuit closing means activated in response to certain of said separate pulses to connect together the column and row leads corresponding to each respective one of the digits of said telephone number one at a time sequentially for dialing said telephone number.

* * * * *